US012398858B1

(12) United States Patent
Wang

(10) Patent No.: US 12,398,858 B1
(45) Date of Patent: Aug. 26, 2025

(54) KNOCK-DOWN (KD) LAMPSHADE

(71) Applicant: Dong Guan City Howin Decoration Products Co., LTD, Dongguan (CN)

(72) Inventor: Pinjie Wang, Dongguan (CN)

(73) Assignee: Dong Guan City Howin Decoration Products Co., LTD, Dongguan (CN)

( * ) Notice: Subject to any disclaimer, the term of this patent is extended or adjusted under 35 U.S.C. 154(b) by 0 days.

(21) Appl. No.: 18/800,261

(22) Filed: Aug. 12, 2024

(30) Foreign Application Priority Data

Jul. 11, 2024 (CN) ......................... 202410925397.9
Jul. 11, 2024 (CN) ......................... 202421632460.1

(51) Int. Cl.
*F21V 1/06* (2006.01)

(52) U.S. Cl.
CPC ..................................... *F21V 1/06* (2013.01)

(58) Field of Classification Search
CPC ......................................................... F21V 1/06
See application file for complete search history.

(56) References Cited

U.S. PATENT DOCUMENTS 11,009,211 B1 * 5/2021 Zhong ....................... F21V 1/06
12,018,813 B1 * 6/2024 Schaak ................... F21V 1/143
2013/0010477 A1 * 1/2013 Wu ....................... F21V 17/105
362/351
2024/0183513 A1 * 6/2024 Pratt ......................... F21V 1/04

FOREIGN PATENT DOCUMENTS

| | | |
|---|---|---|
| CN | 207716352 U | 8/2018 |
| CN | 214790912 U | 11/2021 |
| CN | 215112449 U | 12/2021 |
| CN | 218295579 U | 1/2023 |

* cited by examiner

*Primary Examiner* — Zheng Song
(74) *Attorney, Agent, or Firm* — Bayramoglu Law Offices LLC

(57) ABSTRACT

A knock-down (KD) lampshade includes a lampshade body, an upper iron ring, and a lower iron ring. The lampshade body is cylindrical. The upper iron ring is detachably connected to an upper end of an inner sidewall of the lampshade body. The lower iron ring is detachably connected to a lower end of the inner sidewall of the lampshade body. The lower iron ring is formed by detachably connecting a plurality of arc-shaped lower iron ring rods having a same diameter, and the upper iron ring is formed by detachably connecting a plurality of arc-shaped upper iron ring rods having a same diameter. A support assembly is provided in the lower iron ring or the upper iron ring. The support assembly is detachably connected to the lower iron ring or the upper iron ring. The KD lampshade is assembled and disassembled conveniently, saves the space, and is transported conveniently.

17 Claims, 8 Drawing Sheets

KNOCK-DOWN (KD) LAMPSHADE

CROSS REFERENCE TO THE RELATED APPLICATIONS

This application is based upon and claims priority to Chinese Patent Applications No. 202410925397.9 and 202421632460.1, both filed on Jul. 11, 2024, the entire contents of which are incorporated herein by reference.

TECHNICAL FIELD

The present disclosure relates to the technical field of lampshades, and in particular to a knock-down (KD) lampshade.

BACKGROUND

As an important component of lamps, the lampshade is no longer limited to lighting improvement, but also serves as a decorative to room environments. In order to meet the ever-changing pursuit of people on beauty, use innovative new materials, control the cost, simplify the manufacturing process, save the packaging and transportation expenses, and facilitate home assembly, a variety of lampshades emerge in an endless way. However, most of existing lampshades have the large size and are not transported conveniently, because the holder and the body are non-detachable. Moreover, lampshades are prone to being crushed and damaged in transportation, and are not able to be cleaned conveniently.

SUMMARY

In order to solve the above technical problems, the present disclosure provides a KD lampshade. The KD lampshade is assembled and disassembled conveniently, saves the space, and is transported conveniently.

To achieve the above objective, the present disclosure adopts the following technical solutions:

A KD lampshade includes a lampshade body, an upper iron ring, and a lower iron ring, where the lampshade body is of a cylindrical shape; the upper iron ring is detachably connected to an upper end of an inner sidewall of the lampshade body; the lower iron ring is detachably connected to a lower end of the inner sidewall of the lampshade body; the lower iron ring is formed by detachably connecting a plurality of arc-shaped lower iron ring rods having a same diameter, and the upper iron ring is formed by detachably connecting a plurality of arc-shaped upper iron ring rods having a same diameter; a support assembly is provided in the lower iron ring or the upper iron ring; and the support assembly is detachably connected to the lower iron ring or the upper iron ring.

Further, the support assembly includes a support piece and a plurality of support rods; the support piece is coaxial with the lower iron ring; the plurality of support rods are uniformly provided at an outer circumferential side of the support piece; and two ends of each of the support rods are respectively detachably connected to the support piece and the lower iron ring.

Further, the support rod is detachably connected to the lower iron ring through a first connecting piece; the first connecting piece has an approximately T-shaped cross section; and a transverse portion of the first connecting piece is connected to docking ends of two adjacent arc-shaped lower iron ring rods, and a vertical portion of the first connecting piece is connected to an end of the support rod.

Further, the transverse portion is a first arc-shaped member; an inserting groove configured to be inserted by each of the arc-shaped lower iron ring rods is formed along a radian direction of the first arc-shaped member; the vertical portion is a cylinder; and an inserting hole matching with the end of the support rod is formed along an axial direction of the cylinder.

Further, when the support assembly is not provided in the upper iron ring or the lower iron ring, two adjacent arc-shaped upper iron ring rods or the arc-shaped lower iron ring rods are connected through a second connecting piece; the second connecting piece is a second arc-shaped member; and an inserting groove configured to be inserted by each of the arc-shaped upper iron ring rods is formed along a radian direction of the second arc-shaped member.

Further, the inserting groove extends from an outer convex side of each of the first arc-shaped member and the second arc-shaped member to an inner concave side; the inserting groove is formed by a fully penetrating square entrance and a fan-shaped clamping groove having a radian of greater than 180°; and a diameter of the fan-shaped clamping groove matches with the arc-shaped lower iron ring rod.

Further, the inserting groove of the first arc-shaped member and the inserting groove of the second arc-shaped member respectively penetrate through the whole first arc-shaped member and the whole second arc-shaped member, and adjacent ends of two adjacent arc-shaped lower iron ring rods as well as adjacent ends of two adjacent arc-shaped upper iron ring rods abut against each other or are spaced in the inserting groove; alternatively, the inserting groove of the first arc-shaped member is formed by two inserting sub-grooves located at two sides of the first arc-shaped member, the inserting groove of the second arc-shaped member is formed by two inserting sub-grooves located at two sides of the second arc-shaped member, and the two inserting sub-grooves do not communicate with each other; alternatively, the inserting groove of the first arc-shaped member penetrates through the whole first arc-shaped member, the inserting groove of the second arc-shaped member is formed by the two inserting sub-grooves located at the two sides of the second arc-shaped member, and the two inserting sub-grooves do not communicate with each other; and alternatively, the inserting groove of the second arc-shaped member penetrates through the whole second arc-shaped member, the inserting groove of the first arc-shaped member is formed by the two inserting sub-grooves located at the two sides of the first arc-shaped member, and the two inserting sub-grooves do not communicate with each other.

Further, the support piece includes a circular table; a plurality of support rod inserting tables are uniformly provided at an outer circumferential side of the circular table; a support rod inserting groove is formed in each of the inserting tables; the support rod inserting groove penetrates through a side of the inserting table along a radial direction of the circular table; the support rod includes a first horizontal circular rod, an oblique circular rod and a second horizontal circular rod that are formed integrally; the oblique circular rod inclines upward relative to the first horizontal circular rod; a free end of the first horizontal circular rod is stretched into the inserting hole; a side of the second horizontal circular rod adjacent to a free end is provided with a square clamping table; and the support rod inserting groove matches with the square clamping table and horizontal circular rods connected to two sides of the square clamping table, or an end of the second horizontal circular rod inserted into the circular table is provided with the square clamping table.

Further, the lampshade body is a bendable lampshade cut piece; a plurality of fasteners are uniformly provided at a circumferential side of each of an upper portion and a lower portion of the inner side of the lampshade body; clamping grooves on the fasteners are fan-shaped clamping grooves matching with the lower iron ring and the upper iron ring; and the fan-shaped clamping grooves each have an angle of greater than 180°.

Further, the lampshade body is a bendable lampshade cut piece; the KD lampshade further includes a plurality of arc-shaped sleeves; an arc length of each of the arc-shaped sleeves is less than an arc length of each of the arc-shaped upper iron ring rods and an arc length of each of the arc-shaped lower iron ring rods; and during use, the plurality of arc-shaped sleeves are fixed at intervals at the upper end and the lower end of the inner sidewall of the lampshade body, the arc-shaped upper iron ring rod and the arc-shaped lower iron ring rod are respectively inserted by one arc-shaped sleeve; and the first connecting piece is provided between two adjacent arc-shaped sleeves.

Further, the lampshade body is a bendable lampshade cut piece; the KD lampshade further includes a plurality of arc-shaped sleeves; an arc length of each of the arc-shaped sleeves is less than an arc length of each of the arc-shaped upper iron ring rods and an arc length of each of the arc-shaped lower iron ring rods; and during use, the plurality of arc-shaped sleeves are fixed at intervals at the upper end and the lower end of the inner sidewall of the lampshade body, the arc-shaped upper iron ring rod and the arc-shaped lower iron ring rod are respectively inserted by one arc-shaped sleeve; and the second connecting piece is provided between two adjacent arc-shaped sleeves.

Further, there are 2-4 arc-shaped upper iron ring rods and 2-4 arc-shaped lower iron ring rods; and a diameter of the lampshade body is gradually increased from top to bottom, or gradually decreased from top to bottom, or unchanged.

According to the KD lampshade provided by the present disclosure, during shipment, the lampshade cut piece is stored alone, the arc-shaped upper iron ring rod and the arc-shaped lower iron ring rod are laid flat alone, the support rod and the support table are stored alone, and the first connecting piece and the second connecting piece are stored alone. Compared with the existing detachable lampshade, the present disclosure further saves the space, and is transported conveniently. During use, a U-shaped adhesive tape is provided inside an upper edge and a lower edge of the lampshade cut piece. The arc-shaped upper iron ring rod is connected to the support table through the first connecting piece and the support rod. The arc-shaped lower iron ring rod is connected through the second connecting piece, and then clamped with the fastener. A left junction and a right junction of the lampshade cut piece are connected by a magic tape.

Figure 1:
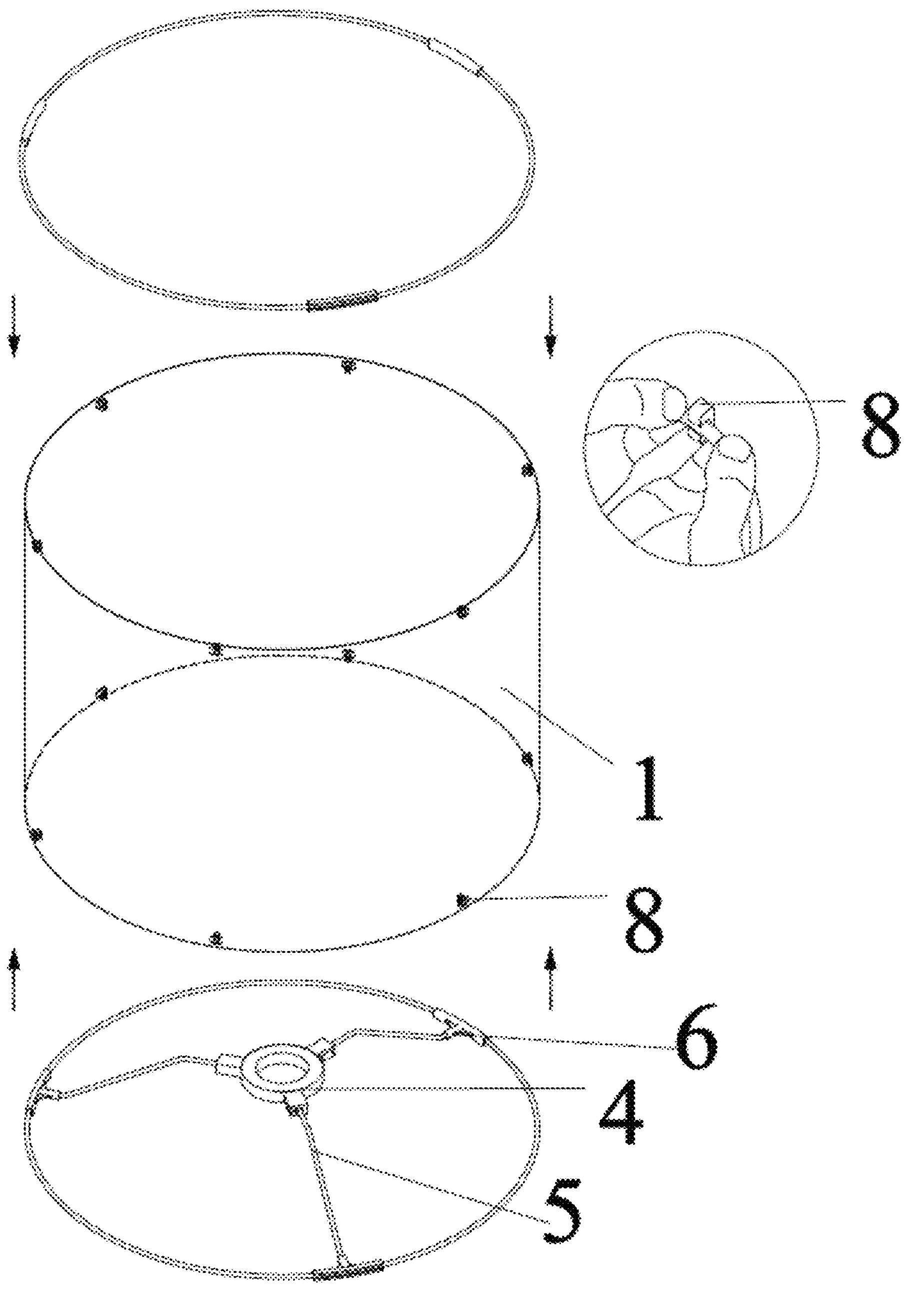
FIG. 1 is a schematic view illustrating mounting of a KD lampshade according to the present disclosure.
Figure 2:
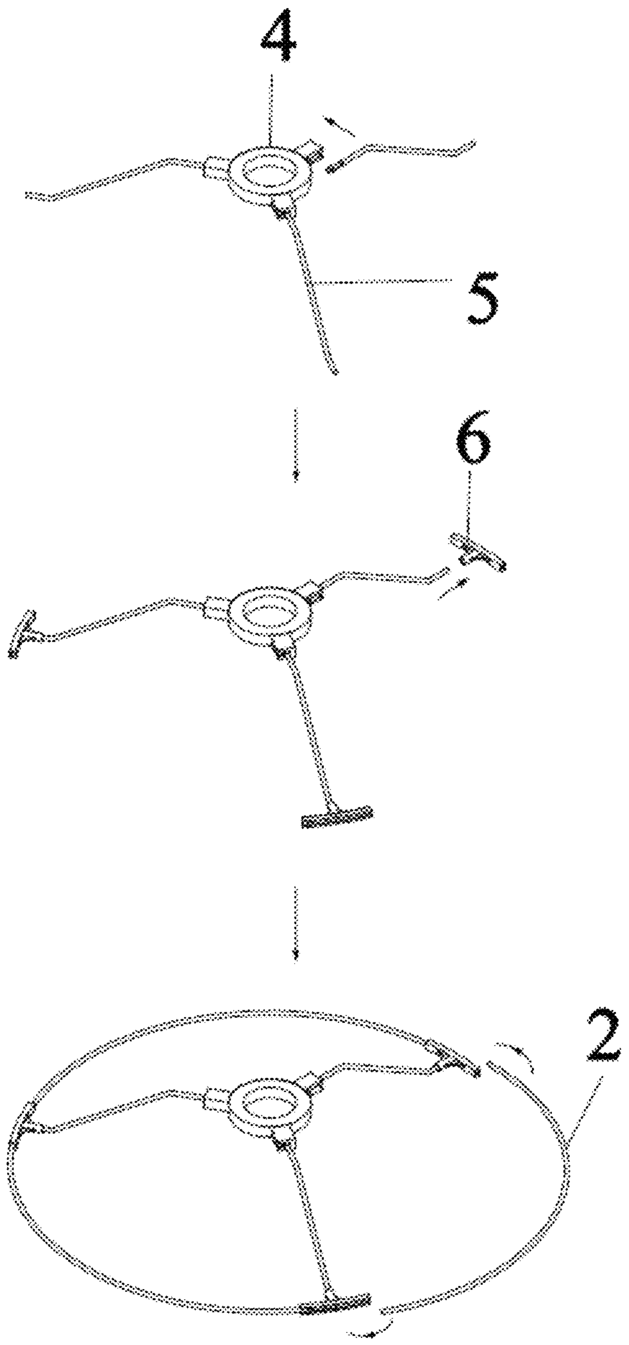
FIG. 2 is a schematic view illustrating connection between an arc-shaped lower iron ring rod and a support assembly according to the present disclosure.
Figure 3:
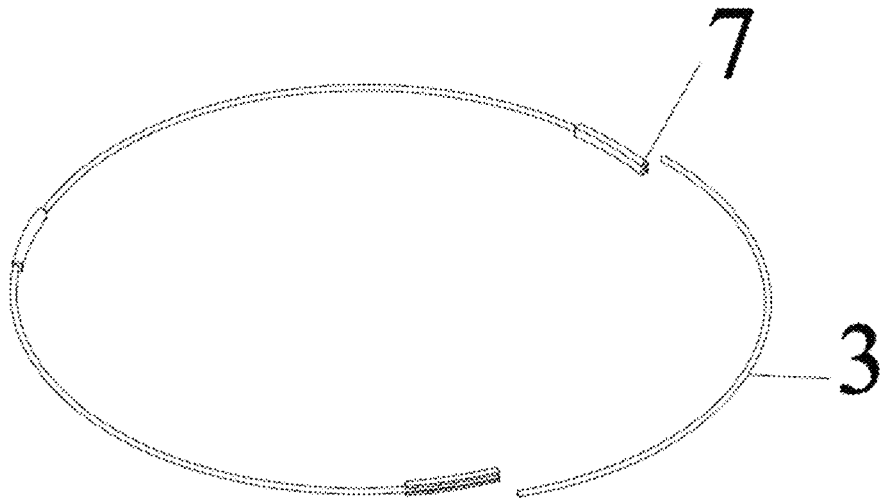
FIG. 3 is a schematic view illustrating connection of an arc-shaped upper iron ring rod according to the present disclosure.
Figure 4:
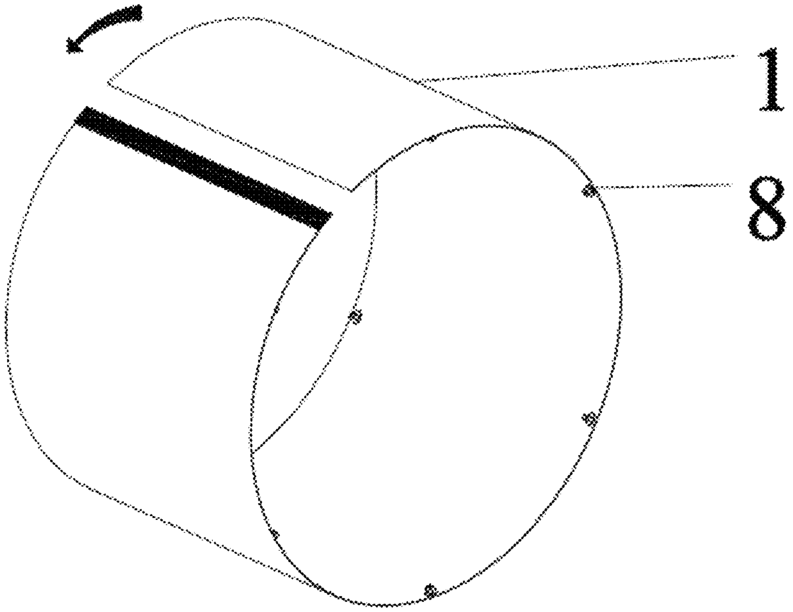
FIG. 4 is a schematic structural view of a lampshade body according to the present disclosure.

In the figures: 1—lampshade body, 2—arc-shaped lower iron ring rod, 3—arc-shaped upper iron ring rod, 4—support piece, 5—support rod, 6—first connecting piece, 7—second arc-shaped member, 8—fastener, 9—arc-shaped sleeve, 41—circular table, 42—inserting table, 421—support rod inserting groove, 51—first horizontal circular rod, 52—oblique circular rod, 53—second horizontal circular rod, 54—square clamping table, 61—first arc-shaped member, 611—inserting groove, 62—cylinder, 621—inserting hole, 6111—square entrance, and 6112—fan-shaped clamping groove.

DETAILED DESCRIPTION OF THE EMBODIMENTS

The technical solutions in the embodiments of the present disclosure will be clearly and completely described below in combination with the accompanying drawings in the embodiments of the present disclosure. All the other embodiments derived by those of ordinary skill in the art based on the embodiments of the present disclosure without creative efforts shall fall within the protection scope of the present disclosure.

Embodiment 1

As shown in FIG. 1 to FIG. 9, a KD lampshade includes lampshade body 1, an upper iron ring, and a lower iron ring. The lampshade body 1 is of a cylindrical shape, and may be generally designed as any of the following: (1) cylinder shape with the same diameter form top to bottom; (2) a flared mouth with a wide top and a narrow bottom, the diameter of which decreases gradually from top to bottom; and (3) a flared shape with a narrow top and a wide bottom, the diameter of which is gradually increasing from top to bottom. The upper iron ring is detachably connected to an upper end of an inner sidewall of the lampshade body 1. The lower iron ring is detachably connected to a lower end of the inner sidewall of the lampshade body 1. The lower iron ring is formed by detachably connecting three arc-shaped lower iron ring rods 2 having a same diameter, and the upper iron ring is formed by detachably connecting three arc-shaped upper iron ring rods 3 having a same diameter. A support assembly is provided in the lower iron ring. The support assembly is detachably connected to the lower iron ring.

The support assembly includes support piece 4 and three support rods 5. The support piece 4 is coaxial with the lower iron ring. The three support rods 5 are uniformly provided at an outer circumferential side of the support piece 4. The support rods 5 each are detachably connected to the lower iron ring through first connecting piece 6. The first connecting piece 6 has an approximately T-shaped cross section. A transverse portion of the first connecting piece 6 is first arc-shaped member 61. Inserting groove 611 configured to be inserted by each of the arc-shaped lower iron ring rods 2 is formed along a radian direction of the first arc-shaped member 61. A vertical portion of the first connecting piece 6 is cylinder 62. Inserting hole 621 matching with an end of the support rod 5 is formed along an axial direction of the cylinder 62.

Two adjacent arc-shaped upper iron ring rods 3 are connected through a second connecting piece. The second connecting piece is second arc-shaped member 7 having a same diameter as each of the arc-shaped upper iron ring rods 3. Inserting groove 611 configured to be inserted by the arc-shaped upper iron ring rod 3 is formed along a radian direction of the second arc-shaped member 7. The inserting groove 611 extends from an outer convex side of each of the first arc-shaped member 61 and the second arc-shaped member to an inner concave side. The inserting groove 611 is formed by fully penetrating square entrance 6111 and fan-shaped clamping groove 6112 having a radian of greater than 180°. A diameter of the fan-shaped clamping groove 6112 matches with the arc-shaped lower iron ring rod 2. In the embodiment, the inserting groove 611 of the first arc-shaped member 61 and the inserting groove 611 of the second arc-shaped member respectively penetrate through the whole first arc-shaped member 61 and the whole second arc-shaped member 7, and adjacent ends of two adjacent arc-shaped lower iron ring rods 2 as well as adjacent ends of two adjacent arc-shaped upper iron ring rods 3 abut against each other or spaced in the inserting groove 611.

In some embodiments, the inserting groove 611 of the first arc-shaped member 61 is formed by two inserting sub-grooves 611 located at two sides of the first arc-shaped member 61, the inserting groove 611 of the second arc-shaped member is formed by two inserting sub-grooves located at two sides of the second arc-shaped member 7, and the two inserting sub-grooves 611 do not communicate with each other. Alternatively, the inserting groove 611 of the first arc-shaped member 61 penetrates through the whole first arc-shaped member 61, the inserting groove 611 of the second arc-shaped member 7 is formed by the two inserting sub-grooves 611 located at the two sides of the second arc-shaped member 7, and the two inserting sub-grooves 611 do not communicate with each other. Alternatively, the inserting groove 611 of the second arc-shaped member 7 penetrates through the whole second arc-shaped member 7, the inserting groove 611 of the first arc-shaped member 61 is formed by the two inserting sub-grooves 611 located at the two sides of the first arc-shaped member 61, and the two inserting sub-grooves 611 do not communicate with each other.

Figure 5:
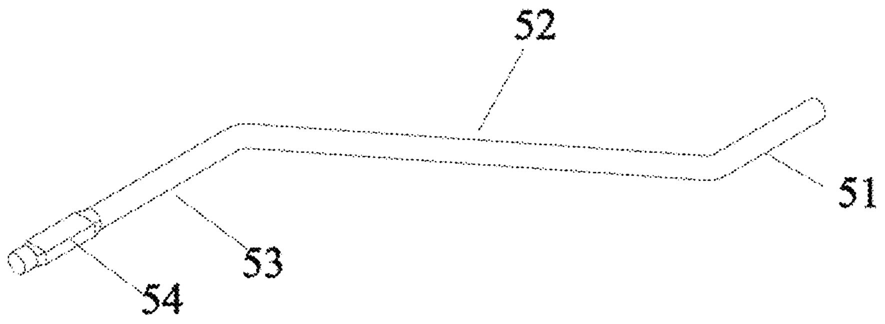
FIG. 5 is a first schematic structural view of a support rod according to the present disclosure.
Figure 6:
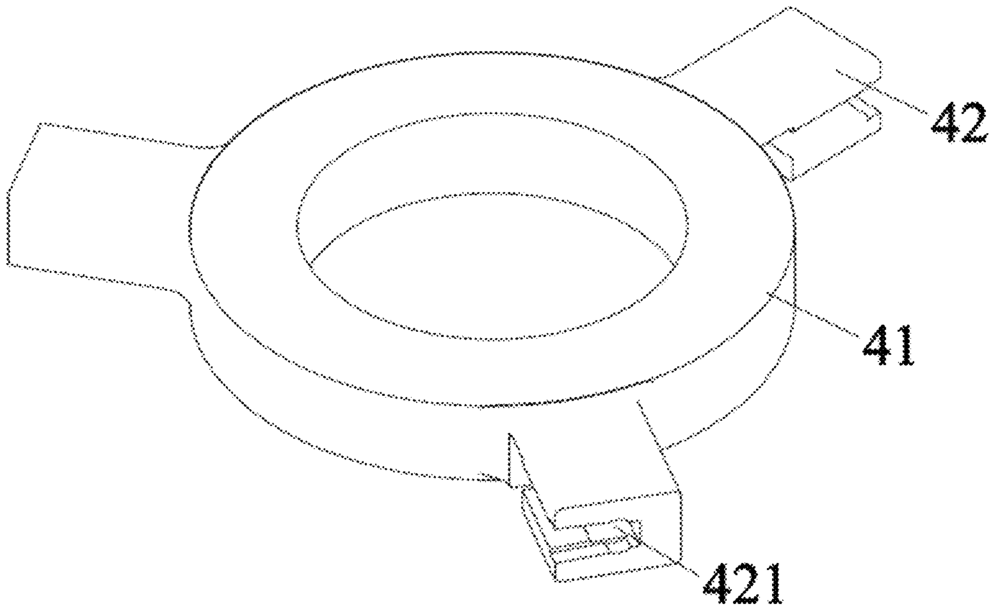
FIG. 6 is a schematic structural view of a support piece according to the present disclosure.
Figure 7:
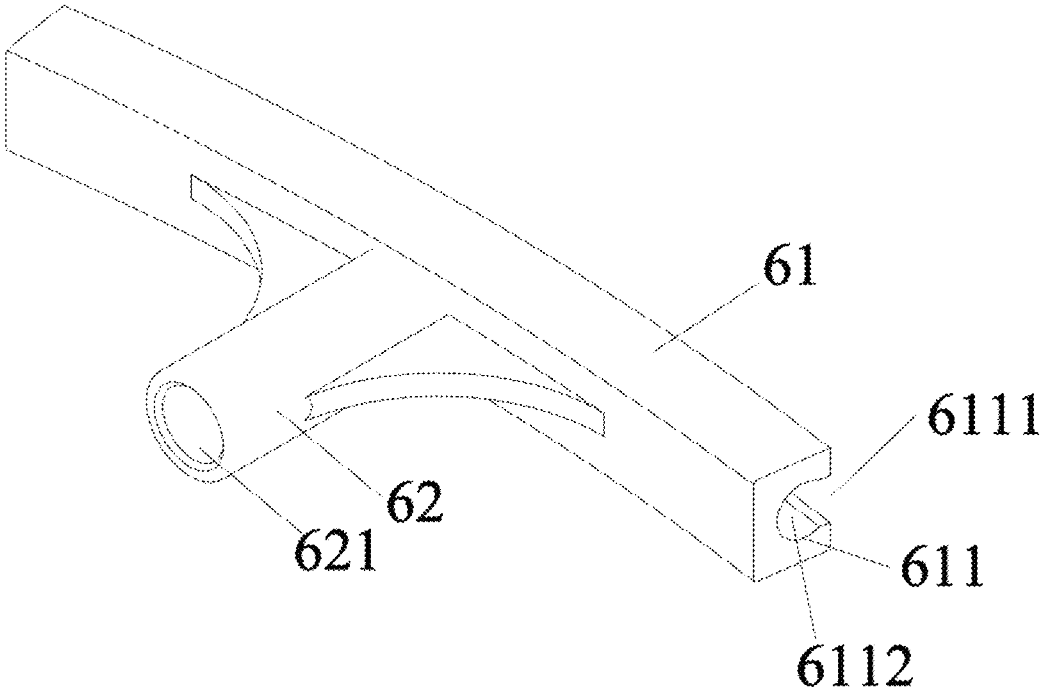
FIG. 7 is a schematic structural view of a first connecting piece according to the present disclosure.
Figure 8:
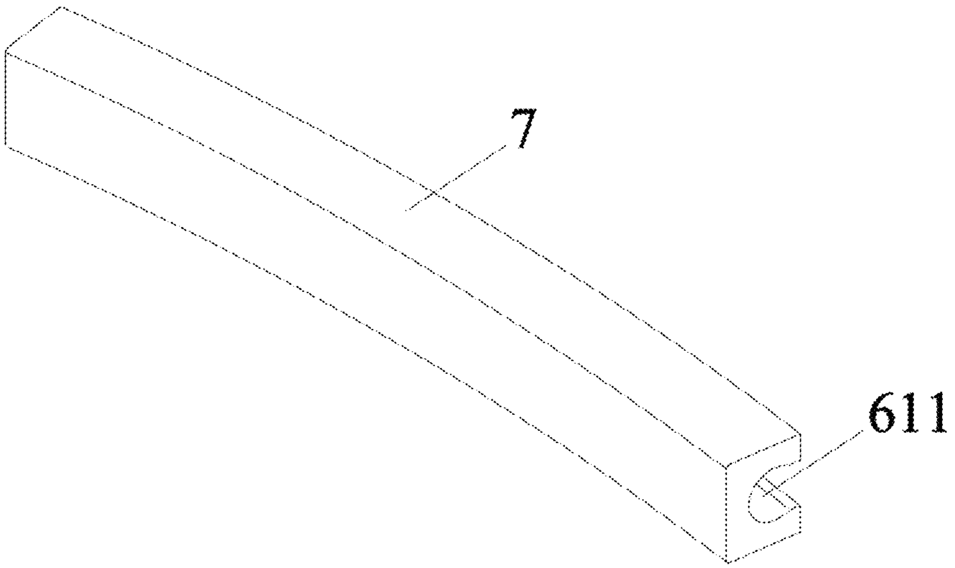
FIG. 8 is a schematic structural view of a second arc-shaped member according to the present disclosure.
Figure 9:
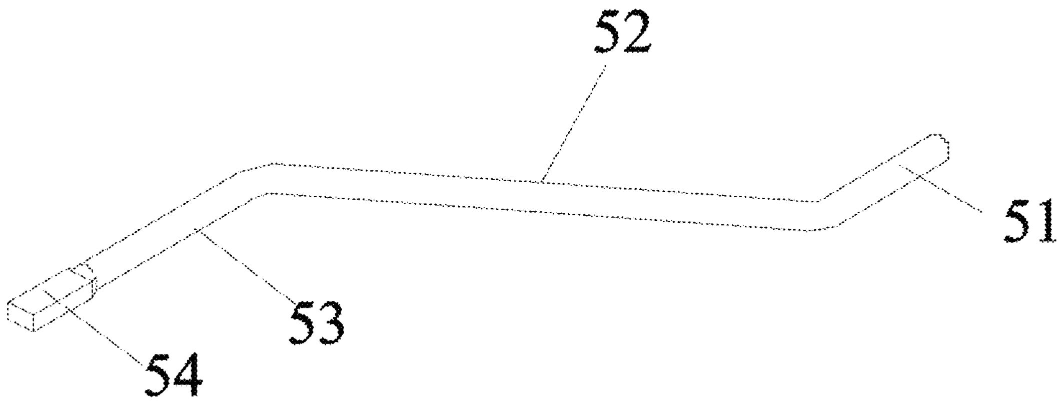
FIG. 9 is a second schematic structural view of a support rod according to the present disclosure.

The support piece 4 includes circular table 41. A plurality of inserting tables 42 are uniformly provided at an outer circumferential side of the circular table 41. Support rod inserting groove 421 is formed in each of the inserting tables 42. The support rod inserting groove 421 penetrates through a side of the inserting table 42 along a radial direction of the circular table 41. The support rod 5 includes first horizontal circular rod 51, oblique circular rod 52, and second horizontal circular rod 53 that are formed integrally. The oblique circular rod 52 inclines upward relative to the first horizontal circular rod 51. A free end of the first horizontal circular rod 51 is stretched into the inserting hole 621. A side of the second horizontal circular rod 53 adjacent to a free end is provided with square clamping table 54. The support rod inserting groove 421 matches with the square clamping table 54 and horizontal circular rods connected to two sides of the square clamping table 54, or an end of the second horizontal circular rod 53 inserted into the circular table 41 is provided with the square clamping table 54. When the square clamping table 54 is located at the end of the second horizontal circular rod 53, as shown in FIG. 9, the support rod is inserted into the inserting groove 421 along the radial direction of the circular table. When the square clamping table 54 is located inside the end of the second horizontal circular rod 53, as shown in FIG. 5, the support rod is clamped into the inserting groove from a side opening of the inserting groove 421.

The lampshade body 1 is a bendable lampshade cut piece. A plurality of fasteners 8 are uniformly provided at a circumferential side of each of an upper portion and a lower portion of the inner side of the lampshade body 1. Clamping grooves on the fasteners 8 are fan-shaped clamping grooves matching with the lower iron ring and the upper iron ring. The fan-shaped clamping grooves each have an angle of greater than 180°.

The diameter of a circular arc-shaped portion of the support rod inserting groove 421 is varied for different mounting manners of the lampshade. For example, when the lampshade is mounted on a phenolic lampholder, the diameter is 36 MM. When the lampshade is mounted on a ceramic lampholder, the diameter is 42 MM. When the lampshade is mounted on a central tube and a lampshade holder, the diameter is 11 MM. When the lampshade is mounted on a lampholder UNO hole, the diameter is 32 MM. When the lampshade is mounted on an E12 lampholder, the diameter is 29 MM.

Embodiment 2

Figure 10:
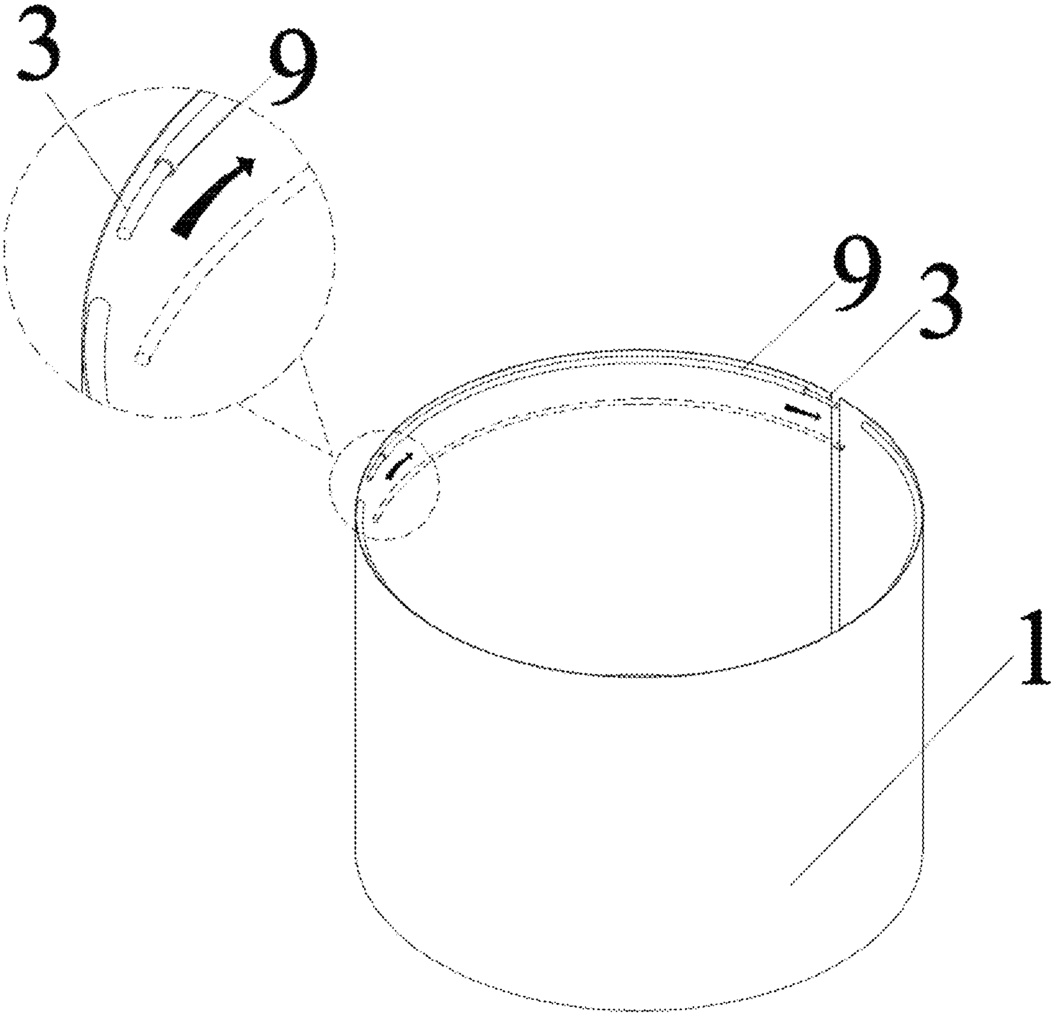
FIG. 10 is a first schematic view illustrating mounting according to Embodiment 2 of the present disclosure.
Figure 11:
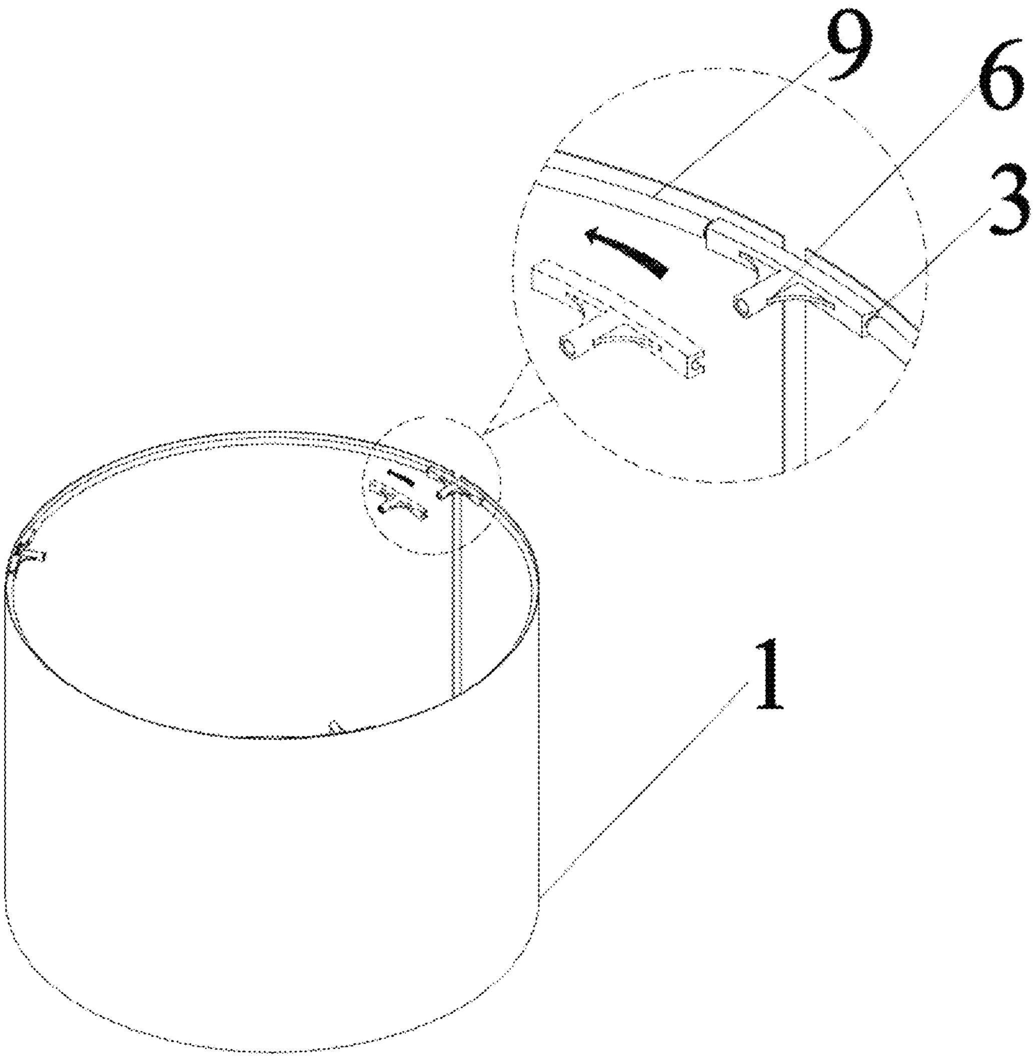
FIG. 11 is a second schematic view illustrating mounting according to Embodiment 2 of the present disclosure.
Figure 12:
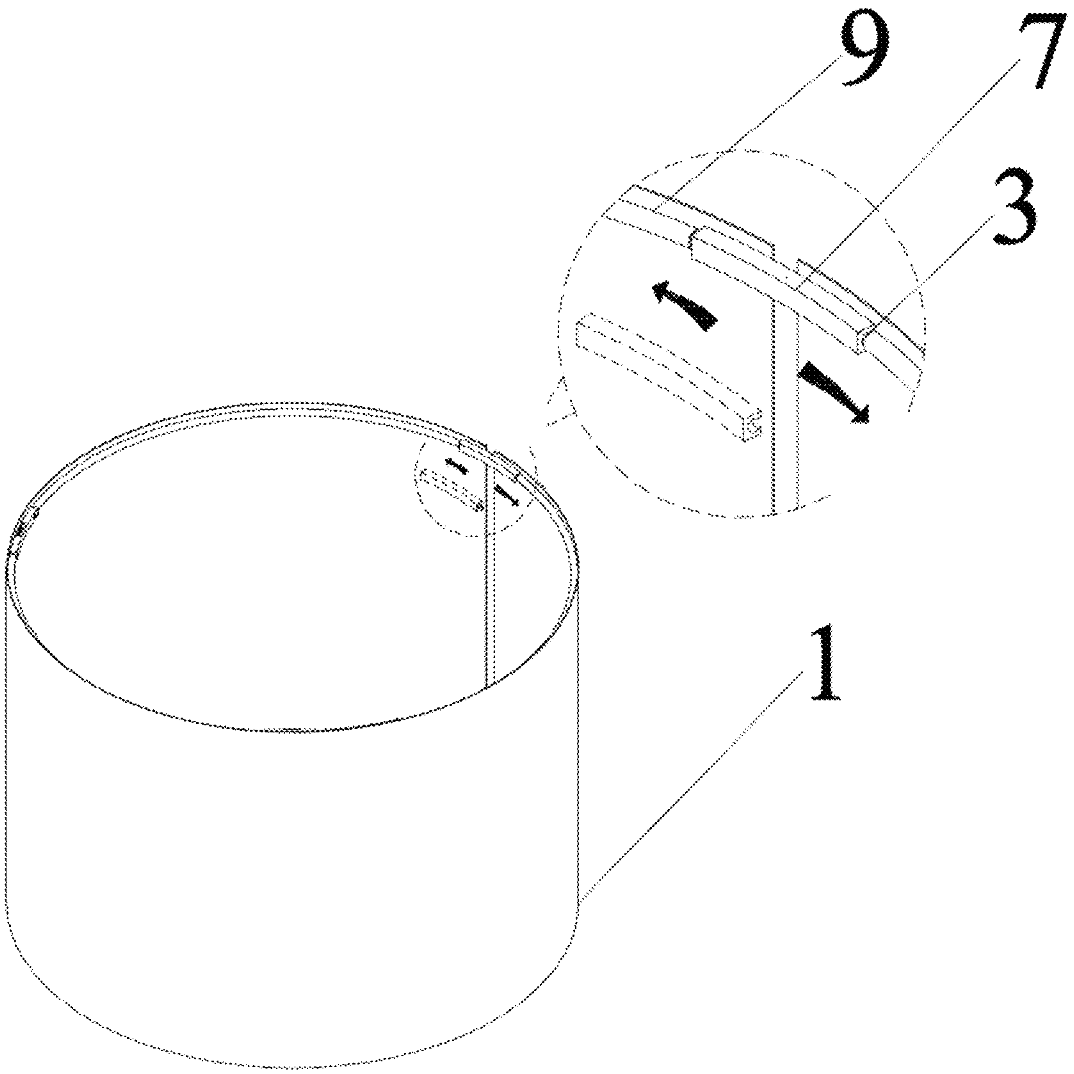
FIG. 12 is a second schematic view illustrating mounting according to Embodiment 2 of the present disclosure.

As shown in FIG. 10 to FIG. 12, compared the embodiment with Embodiment 1, except for a manner that the upper iron ring and the lower iron ring are connected to the lampshade, other contents are the same as those in Embodiment 1. In the embodiment, the KD lampshade further includes six arc-shaped sleeves 9. An arc length of each of the arc-shaped sleeves 9 is less than an arc length of each of the arc-shaped upper iron ring rods 3 and an arc length of each of the arc-shaped lower iron ring rods 2. During use, the six arc-shaped sleeves 9 are divided into two groups. Three arc-shaped sleeves 9 in each group are fixed at intervals at each of the upper end and the lower end of the inner sidewall of the lampshade body 1. The arc-shaped upper iron ring rod 3 and the arc-shaped lower iron ring rod 2 are respectively inserted by one arc-shaped sleeve 9. The first connecting piece 6 and the second connecting piece 7 each are provided between two adjacent arc-shaped sleeves 9. Two ends of each of the arc-shaped upper iron ring rod 3 and the arc-shaped lower iron ring rod 2 are stretched in the first connecting piece 6 or the second connecting piece 7.

Although the embodiments of the present disclosure have been illustrated and described, it should be understood that those of ordinary skill in the art may make various changes, modifications, replacements and variations to the above embodiments without departing from the principle and spirit of the present disclosure, and the scope of the present disclosure is limited by the appended claims and their legal equivalents.

What is claimed is:

1. A knock-down (KD) lampshade, comprising a lampshade body, an upper iron ring, and a lower iron ring, wherein the lampshade body is of a cylindrical shape; the upper iron ring is detachably connected to an upper end of an inner sidewall of the lampshade body; the lower iron ring is detachably connected to a lower end of the inner sidewall of the lampshade body; the lower iron ring is formed by detachably connecting a plurality of arc-shaped lower iron ring rods having a first same diameter, and the upper iron ring is formed by detachably connecting a plurality of arc-shaped upper iron ring rods having a second same diameter; a support assembly is provided in the lower iron ring or the upper iron ring; and the support assembly is detachably connected to the lower iron ring or the upper iron ring, wherein the support assembly comprises a support piece and a plurality of support rods, the support piece is coaxial with the lower iron ring, the plurality of support rods are uniformly provided at an outer circumferential side of the support piece, and two ends of each of the plurality of support rods are respectively detachably connected to the support piece and the lower iron ring, wherein each of the plurality of support rods is detachably connected to the lower iron ring through a first connecting piece, the first connecting piece has an approximately T-shaped cross section, and a transverse portion of the first connecting piece is connected to docking ends of two adjacent arc-shaped lower iron ring rods, and a vertical portion of the first connecting piece is connected to an end of each of the plurality of support rods, and wherein the transverse portion is a first arc-shaped member, an inserting groove configured to be inserted by each of the plurality of arc-shaped lower iron ring rods is formed along a radian direction of the first arc-shaped member, the vertical portion is a cylinder; and an inserting hole matching with the end of each of the plurality of support rods is formed along an axial direction of the cylinder.

2. The KD lampshade according to claim 1, wherein when the support assembly is not provided in the upper iron ring or the lower iron ring, two adjacent arc-shaped upper iron ring rods or two adjacent arc-shaped lower iron ring rods are connected through a second connecting piece; the second connecting piece is a second arc-shaped member; and an inserting groove configured to be inserted by each of the plurality of arc-shaped upper iron ring rods is formed along a radian direction of the second arc-shaped member.

3. The KD lampshade according to claim 2, wherein the inserting groove extends from an outer convex side of each of the first arc-shaped member and the second arc-shaped member to an inner concave side; the inserting groove is formed by a fully penetrating square entrance and a fan-shaped clamping groove having a radian of greater than 180°; and a diameter of the fan-shaped clamping groove matches with each of the plurality of arc-shaped lower iron ring rods.

4. The KD lampshade according to claim 3, wherein the inserting groove of the first arc-shaped member and the inserting groove of the second arc-shaped member respectively penetrate through the whole first arc-shaped member and the whole second arc-shaped member, and adjacent ends of two adjacent arc-shaped lower iron ring rods as well as adjacent ends of two adjacent arc-shaped upper iron ring rods abut against each other or are spaced in the inserting groove; alternatively, the inserting groove of the first arc-shaped member is formed by two inserting sub-grooves located at two sides of the first arc-shaped member, the inserting groove of the second arc-shaped member is formed by two inserting sub-grooves located at two sides of the second arc-shaped member, and the two inserting sub-grooves do not communicate with each other; alternatively, the inserting groove of the first arc-shaped member penetrates through the whole first arc-shaped member, the inserting groove of the second arc-shaped member is formed by the two inserting sub-grooves located at the two sides of the second arc-shaped member, and the two inserting sub-grooves do not communicate with each other; and alternatively, the inserting groove of the second arc-shaped member penetrates through the whole second arc-shaped member, the inserting groove of the first arc-shaped member is formed by the two inserting sub-grooves located at the two sides of the first arc-shaped member, and the two inserting sub-grooves do not communicate with each other.

5. The KD lampshade according to claim 4, wherein the plurality of arc-shaped upper iron ring rods comprise 2-4 arc-shaped upper iron ring rods, and the plurality of arc-shaped lower iron ring rods comprise 2-4 arc-shaped lower iron ring rods; and a diameter of the lampshade body is gradually increased from top to bottom, or gradually decreased from top to bottom, or unchanged.

6. The KD lampshade according to claim 3, wherein the plurality of arc-shaped upper iron ring rods comprise 2-4 arc-shaped upper iron ring rods, and the plurality of arc-shaped lower iron ring rods comprise 2-4 arc-shaped lower iron ring rods; and a diameter of the lampshade body is gradually increased from top to bottom, or gradually decreased from top to bottom, or unchanged.

7. The KD lampshade according to claim 2, wherein the lampshade body is a bendable lampshade cut piece; the KD lampshade further comprises a plurality of arc-shaped sleeves; an arc length of each of the plurality of arc-shaped sleeves is less than an arc length of each of the plurality of arc-shaped upper iron ring rods and an arc length of each of the plurality of arc-shaped lower iron ring rods; and during use, the plurality of arc-shaped sleeves are fixed at intervals at the upper end and the lower end of the inner sidewall of the lampshade body, each of the plurality of arc-shaped upper iron ring rods and each of the plurality of arc-shaped lower iron ring rods are respectively inserted by one arc-shaped sleeve; and the second connecting piece is provided between two adjacent arc-shaped sleeves.

8. The KD lampshade according to claim 2, wherein the plurality of arc-shaped upper iron ring rods comprise 2-4 arc-shaped upper iron ring rods, and the plurality of arc-shaped lower iron ring rods comprise 2-4 arc-shaped lower iron ring rods; and a diameter of the lampshade body is gradually increased from top to bottom, or gradually decreased from top to bottom, or unchanged.

9. The KD lampshade according to claim 1, wherein the support piece comprises a circular table; a plurality of support rod inserting tables are uniformly provided at an outer circumferential side of the circular table; a support rod inserting groove is formed in each of the plurality of support rod inserting tables; the support rod inserting groove penetrates through a side of each of the plurality of support rod inserting tables along a radial direction of the circular table; each of the plurality of support rods comprises a first horizontal circular rod, an oblique circular rod and a second horizontal circular rod, wherein the first horizontal circular rod, the oblique circular rod and the second horizontal circular rod are formed integrally; the oblique circular rod inclines upward relative to the first horizontal circular rod; a free end of the first horizontal circular rod is stretched into the inserting hole; a side of the second horizontal circular rod adjacent to a free end of the second horizontal circular rod is provided with a square clamping table; and the support rod inserting groove matches with the square clamping table and horizontal circular rods connected to two sides of the square clamping table, or an end of the second horizontal circular rod inserted into the circular table is provided with the square clamping table.

10. The KD lampshade according to claim 9, wherein the plurality of arc-shaped upper iron ring rods comprise 2-4 arc-shaped upper iron ring rods, and the plurality of arc-shaped lower iron ring rods comprise 2-4 arc-shaped lower iron ring rods; and a diameter of the lampshade body is gradually increased from top to bottom, or gradually decreased from top to bottom, or unchanged.

11. The KD lampshade according to claim 1, wherein the lampshade body is a bendable lampshade cut piece; a plurality of fasteners are uniformly provided at a circumferential side of each of the upper end and the lower end of the inner sidewall of the lampshade body; clamping grooves on the plurality of fasteners are fan-shaped clamping grooves matching with the lower iron ring and the upper iron ring; and the fan-shaped clamping grooves each have an angle of greater than 180°.

12. The KD lampshade according to claim 11, wherein the plurality of arc-shaped upper iron ring rods comprise 2-4 arc-shaped upper iron ring rods, and the plurality of arc-shaped lower iron ring rods comprise 2-4 arc-shaped lower iron ring rods; and a diameter of the lampshade body is gradually increased from top to bottom, or gradually decreased from top to bottom, or unchanged.

13. The KD lampshade according to claim 1, wherein the lampshade body is a bendable lampshade cut piece; the KD lampshade further comprises a plurality of arc-shaped sleeves; an arc length of each of the plurality of arc-shaped sleeves is less than an arc length of each of the plurality of arc-shaped upper iron ring rods and an arc length of each of the plurality of arc-shaped lower iron ring rods; and during use, the plurality of arc-shaped sleeves are fixed at intervals at the upper end and the lower end of the inner sidewall of the lampshade body, each of the plurality of arc-shaped upper iron ring rods and each of the plurality of arc-shaped lower iron ring rods are respectively inserted by one arc-shaped sleeve; and the first connecting piece is provided between two adjacent arc-shaped sleeves.

14. The KD lampshade according to claim 1, wherein the plurality of arc-shaped upper iron ring rods comprise 2-4 arc-shaped upper iron ring rods, and the plurality of arc-shaped lower iron ring rods comprise 2-4 arc-shaped lower iron ring rods; and a diameter of the lampshade body is gradually increased from top to bottom, or gradually decreased from top to bottom, or unchanged.

15. The KD lampshade according to claim 1, wherein the plurality of arc-shaped upper iron ring rods comprise 2-4 arc-shaped upper iron ring rods, and the plurality of arc-shaped lower iron ring rods comprise 2-4 arc-shaped lower iron ring rods; and a diameter of the lampshade body is gradually increased from top to bottom, or gradually decreased from top to bottom, or unchanged.

16. The KD lampshade according to claim 1, wherein the plurality of arc-shaped upper iron ring rods comprise 2-4 arc-shaped upper iron ring rods, and the plurality of arc-shaped lower iron ring rods comprise 2-4 arc-shaped lower iron ring rods; and a diameter of the lampshade body is gradually increased from top to bottom, or gradually decreased from top to bottom, or unchanged.

17. The KD lampshade according to claim 1, wherein the plurality of arc-shaped upper iron ring rods comprise 2-4 arc-shaped upper iron ring rods, and the plurality of arc-shaped lower iron ring rods comprise 2-4 arc-shaped lower iron ring rods; and a diameter of the lampshade body is gradually increased from top to bottom, or gradually decreased from top to bottom, or unchanged.

* * * * *